(12) United States Patent
Lee et al.

(10) Patent No.: US 9,823,770 B2
(45) Date of Patent: Nov. 21, 2017

(54) DISPLAY APPARATUS

(71) Applicant: Samsung Display Co., Ltd., Yongin, Gyeonggi-Do (KR)

(72) Inventors: Dong Eup Lee, Asan-si (KR); Minhyeng Lee, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 171 days.

(21) Appl. No.: 14/795,370

(22) Filed: Jul. 9, 2015

(65) Prior Publication Data

US 2016/0117041 A1    Apr. 28, 2016

(30) Foreign Application Priority Data

Oct. 28, 2014  (KR) .......................... 10-2014-0147323

(51) Int. Cl.
*G06F 3/041*    (2006.01)

(52) U.S. Cl.
CPC .................. *G06F 3/0416* (2013.01)

(58) Field of Classification Search
CPC ...... G06F 3/041; G06F 3/0412; G06F 3/0416; G06F 2203/04103; G06F 1/1626; H05K 1/0277–1/0283; H05K 1/118; H05K 1/147; H05K 1/148; H05K 1/189; H05K 3/36–3/368; H05K 3/4691; H05K 2201/042; H05K 2201/05–2201/058
USPC ........ 345/173; 349/149–152, 12; 439/55–85; 174/250, 254, 255; 361/748–749
See application file for complete search history.

(56) References Cited

U.S. PATENT DOCUMENTS

| 5,516,989 | A | * | 5/1996 | Uedo | ...................... | H05K 1/028 174/250 |
| 6,972,383 | B2 | * | 12/2005 | Akama | ................ | H05K 3/4614 174/255 |
| 8,908,115 | B2 | | 12/2014 | Umezaki et al. | | |
| 8,976,123 | B2 | | 3/2015 | Noguchi et al. | | |
| 8,976,207 | B2 | | 3/2015 | Umezaki et al. | | |
| 2008/0093118 | A1 | * | 4/2008 | Takahashi | ............ | H05K 3/4691 174/264 |
| 2008/0099230 | A1 | * | 5/2008 | Takahashi | ............ | H05K 3/4691 174/250 |

(Continued)

FOREIGN PATENT DOCUMENTS

| KR | 10-0531889 B1 | 11/2005 |
| KR | 10-2010-0106669 A | 10/2010 |

(Continued)

*Primary Examiner* — Roberto Flores
(74) *Attorney, Agent, or Firm* — H.C. Park & Associates, PLC

(57) ABSTRACT

A display apparatus comprises: a display panel configured to display an image; a touch panel disposed on the display panel; and a circuit board electrically connected to each of the display panel and the touch panel, the circuit board including a first surface and a second surface opposite the first surface. The circuit board includes: a first circuit portion including a first connection disposed in the first surface and electrically connected to the display panel; a second circuit portion including a second connection disposed in the second surface and electrically connected to the touch panel; and a bending portion configured to link the first circuit portion to the second circuit portion, and curving in a direction toward the first circuit portion.

14 Claims, 9 Drawing Sheets

(56) References Cited

U.S. PATENT DOCUMENTS

| | | | | |
|---|---|---|---|---|
| 2010/0112833 | A1* | 5/2010 | Jeon | H01R 12/523 439/78 |
| 2010/0277878 | A1* | 11/2010 | Sekido | H04N 1/02815 361/749 |
| 2011/0194262 | A1* | 8/2011 | Naganuma | H05K 3/4691 361/749 |
| 2011/0199739 | A1* | 8/2011 | Naganuma | H05K 3/4691 361/749 |
| 2011/0242050 | A1* | 10/2011 | Byun | G06F 3/044 345/174 |
| 2012/0098774 | A1* | 4/2012 | Abe | G02F 1/133308 345/173 |
| 2012/0228005 | A1* | 9/2012 | Chisaka | H05K 3/4691 174/250 |
| 2012/0327048 | A1* | 12/2012 | Ramrattan | H05K 1/148 345/204 |
| 2013/0083496 | A1* | 4/2013 | Franklin | G06F 1/1626 361/749 |
| 2013/0087375 | A1* | 4/2013 | Tsunoi | H05K 1/0278 174/260 |
| 2013/0153269 | A1* | 6/2013 | Takahashi | H05K 3/368 174/254 |
| 2013/0256001 | A1* | 10/2013 | Sakai | H05K 3/4691 174/251 |
| 2014/0043263 | A1* | 2/2014 | Park | G06F 3/0418 345/173 |
| 2014/0092034 | A1* | 4/2014 | Franklin | G09F 13/0413 345/173 |
| 2015/0002466 | A1 | 1/2015 | Takeuchi et al. | |
| 2015/0053463 | A1* | 2/2015 | Chen | H05K 3/4644 174/254 |
| 2015/0101847 | A1* | 4/2015 | Tsai | H05K 3/4691 174/254 |

FOREIGN PATENT DOCUMENTS

| | | |
|---|---|---|
| KR | 10-1074414 B1 | 10/2011 |
| KR | 10-1309862 B1 | 9/2013 |
| KR | 10-2014-0046267 A | 4/2014 |
| KR | 10-1464172 B1 | 11/2014 |

* cited by examiner

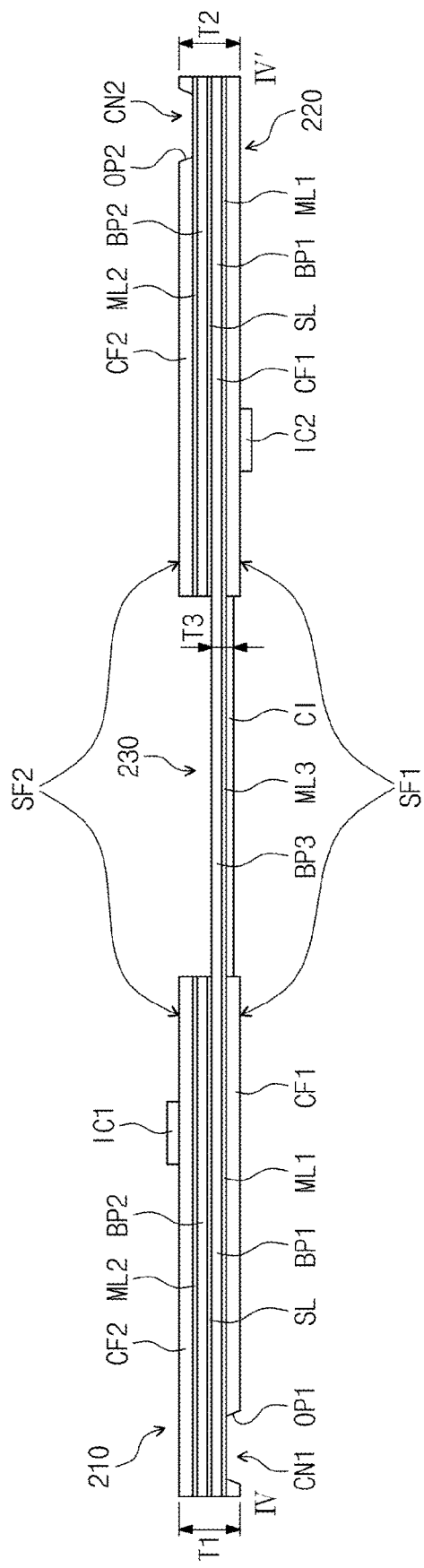

DISPLAY APPARATUS

CLAIM OF PRIORITY

A claim for priority under 35 U.S.C. §119 is made to Korean Patent Application No. 10-2014-0147323 filed Oct. 28, 2014 in the Korean Intellectual Property Office, the entire contents of which are hereby incorporated by reference.

BACKGROUND OF THE INVENTION

The present invention described herein relates to a display apparatus easy to be fabricated.

Touch panels are kinds of input devices rendering users' selections, which are made by the users' hands or other things from guiding instructions indicated on screens of the display apparatuses, to be input as commands into display apparatuses. Such touch panels are equipped in display panels, functioning to convert direct contact points with human hands or other things into electric signals. Then, instructions selected at the contact positions are accepted as input signals in the display apparatuses.

As the touch panels are replaceable for additional input devices operatively connected to the display apparatuses, such as keyboards and mice, those are gradually extending in applications. There are nowadays known a variety of types for touch panels operating in the modes of, e.g. resistive films, optical sensing, electrostatic capacitance, etc. Among them, a capacitive touch panel operates to sense a variation of electrostatic capacitance between a conductive sensing electrode and another peripheral sensing electrode or a ground electrode when a human hand or something contacts therewith, converting its contact point into an electric signal.

SUMMARY OF THE INVENTION

One aspect of embodiments of the present invention is directed to providing a display apparatus which is easy to fabricate.

In an embodiment, a display apparatus may include: a display panel configured to display an image; a touch panel disposed on the display panel; and a circuit board electrically connected with the display panel and the touch panel, including a first surface and a second surface opposite to the first surface. The circuit board may include: a first circuit portion including a first connection disposed in the first surface and electrically connected to the display panel; a second circuit portion including a second connection disposed in the second surface and electrically connected to the touch panel; and a bending portion configured to link the first circuit portion to the second circuit portion, curving in a direction looking toward the first circuit portion.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein:

FIG. 6A is a sectional view taken along IV-IV' of FIG. 5;

DETAILED DESCRIPTION OF THE INVENTION

Figure 1:
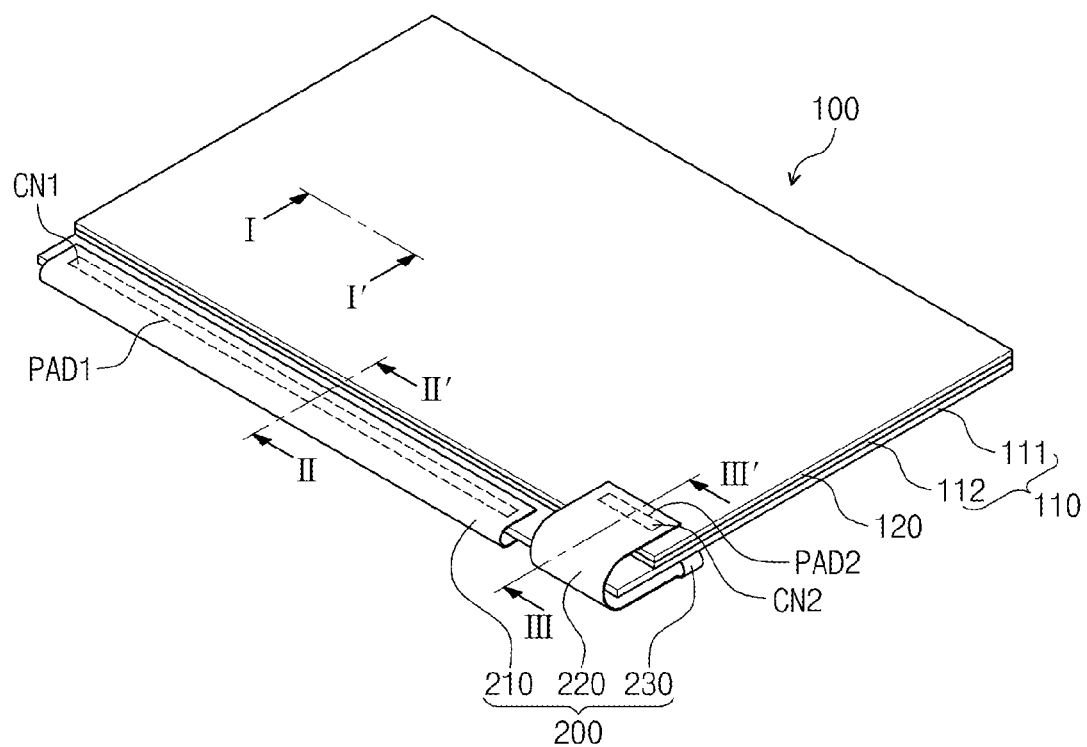
FIG. 1 is perspective view illustrating a display apparatus according to an embodiment of the present invention.

Embodiments will be described in detail with reference to the accompanying drawings. However, the present invention may be embodied in various different forms, and should not be construed as being limited only to the illustrated embodiments. Rather, these embodiments are provided as examples so that this disclosure will be thorough and complete, and will fully convey the concept of the present invention to those skilled in the art. Accordingly, known processes, elements, and techniques are not described with respect to some of the embodiments of the present invention. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "beneath", "below", "lower", "under", "above", "upper", and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein should be interpreted accordingly. In addition, it will also be understood that, when a layer is referred to as being "between" two layers, it can be the only layer between the two layers, or one or more intervening layers may also be present.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that, when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this present invention belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Exemplary embodiments of the present invention in conjunction with accompanying drawings will now be described below.

Figure 2:
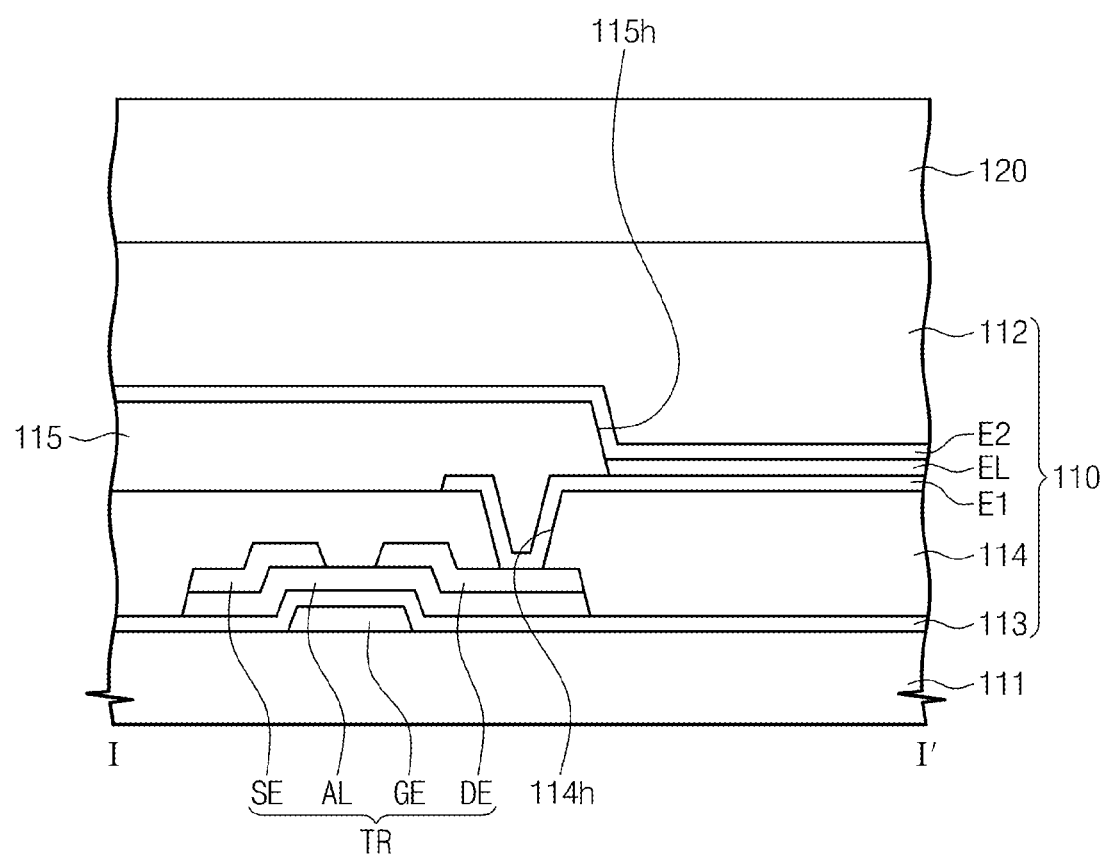
FIG. 2 is a sectional view taken along I-I' of FIG. 1.
Figure 3:
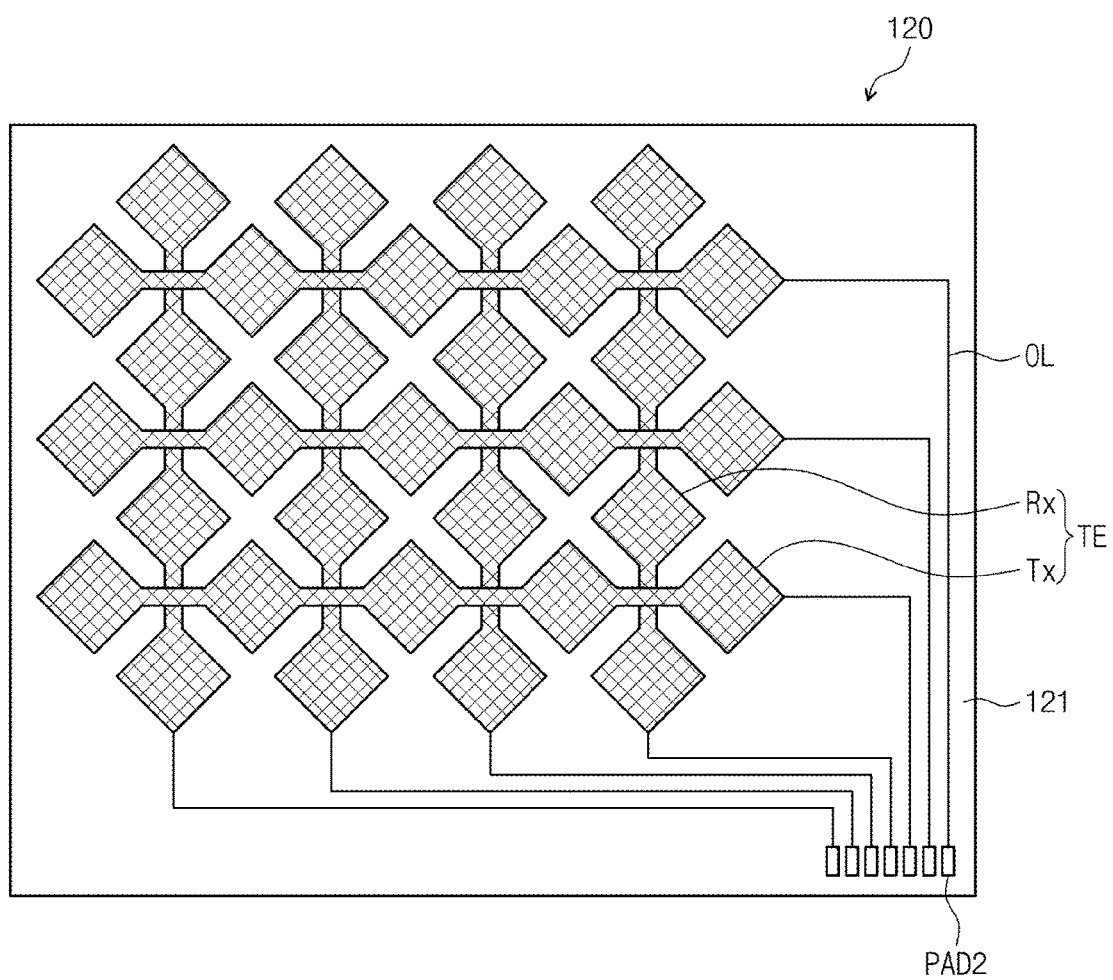
FIG. 3 is a schematic plan view illustrating the touch panel of FIG. 1.

FIG. 1 is a perspective view illustrating a display apparatus according to an embodiment of the present invention, FIG. 2 is a sectional view taken along I-I' of FIG. 1 and FIG. 3 is a schematic plan view illustrating the touch panel of FIG. 1.

Referring to FIGS. 1, 2 and 3, the display apparatus 100 includes a display panel 110, a touch panel 120, and a circuit board 200.

In this embodiment, the display panel 110 may be an organic light emitting display panel. The display panel 110 may include a first plate 111, a second plate 112, a thin film transistor TR, a first electrode E1, a second electrode E2, an organic light emission layer EL, and a first pad portion PAD1.

The thin film transistor TR may include a gate electrode GE, an active layer AL, a source electrode SE, and a drain electrode DE.

On the first plate 111 may be disposed the gate electrode GE and a gate insulation layer 113 covering the gate electrode GE. On the gate insulation layer 113 may be disposed the active layer AL including a source region, a drain region, and a channel region. The source electrode SE may be placed on the source region of the active layer AL and the drain electrode DE may be placed on the drain region of the active layer AL.

On the gate insulation layer 113 is disposed an insulation layer 114 covering the thin film transistor TR. In the insulation layer 114, a contact hole 114h may be defined to partly expose the drain electrode DE.

On the insulation layer 114 is disposed the first electrode E1. The first electrode E1 may be electrically connected to the drain electrode DE by way of the contact hole 114h which is confined in the insulation layer 114. The first electrode E1 may act as an anode. On the first electrode E1 may be disposed an organic light emission layer EL. The organic light emission layer EL may contact the first electrode E1 by way of an opening 115h of a pixel limit film 115. On the organic light emission layer EL is disposed the second electrode E2. The second electrode E2 may act as a cathode.

In another embodiment, between the organic light emission layer EL and the first electrode E1 may be further disposed a hole injection layer (not shown) and a hole transport layer (not shown), and between the organic emission layer EL and the second electrode E2 may be further disposed an electron transport layer (not shown) and an electron injection layer (not shown).

On the second electrode E2 is disposed the second plate 112. The second plate 112 may be joined with the first plate 111. The second plate 112 is capable of covering components, such as the organic light emission layer EL, to shield the organic light emission layer EL from external gases and moisture. In another embodiment, it is permissible to replace the second plate 112 with a shied layer. This shield layer functions to cover and protect components, which are disposed on the first plate 111, from external gases and moisture that, for example, would flow into the organic light emission layer EL.

While this embodiment is described in such a manner that the display panel 110 is made of an organic light emitting display panel, it may otherwise be available with one of a liquid crystal panel, an electrowetting display panel, an electrophoretic display panel, and a microelectromechanical system display panel.

The touch panel 120 may be disposed on the second plate 112. The touch panel 120 may operate as one of the following types: capacitance, resistive films, infrared rays, and supersonic waves. In this embodiment, the touch panel 120 is described as operating as a capacitive type as an example.

The touch panel 120 may include a plate 121, a sense electrode TE including first sense electrodes Tx and second sense electrodes Rx, a second pad portion PAD2, and an outer line OL.

The plate 121 may be transparent, being formed of a transparent dielectric film. The plate 121 may be made of, but not restricted to, a specific one of general materials, plastic, glass, ceramic, polymer, and so forth. In another embodiment, the sense electrode TE, the second pad portion PAD2 and the outer line OL may be disposed on the second plate 112 of the display panel 110 without the plate 121.

The sense electrode TE responds to a touch input by a user. A user's touch varies the capacitance between the first and second sense electrodes Tx and Rx, respectively, which are included in the sense electrode TE. According to a variation of the capacitance, a sense signal applied to the first sense electrodes Tx can be delayed and supplied to the second sense electrodes Rx. The touch panel 120 is able to sense touch coordinates from a delay value of the sense signal. In sensing the touch coordinates, several ways of measuring mutual capacitance, self capacitance, and so forth may be used.

While this embodiment is delineated as the first and second sense electrodes Tx and Rx, respectively, being shaped in rhombus form, it may not be restricted thereto. In another embodiment, they may be shaped in diverse patterns, e.g. square, rectangle, circle, or irregulars.

The outer line OL may electrically connect the sense electrode TE with the second pad portion PAD2.

The circuit board 200 may include a first circuit portion 210 electrically connected to the first pad portion PAD1, a second circuit portion 220 connected to the second pad PAD2, and a bending portion 230 connecting the first circuit portion 210 to the second circuit portion 220.

The circuit board 200 may be a flexible printed circuit (FPC). For instance, the circuit board 200 may include a base plate. The base plate may be a flexible plastic plate as formed of polyimide or polyester.

As the bending portion 230 functions to connect the first circuit portion 210 to the second portion 220, the first and second circuit portions 210 and 220, respectively, can be integrated without separation from each other. Therefore, any connector is not necessary for electrically connecting the first circuit portion 210 to the second circuit portion 220. Thus, according to this embodiment, such needlessness of additional adhesion for a connector joining the first circuit portion 210 to the second circuit portion 220 is helpful to simplification of the process organization.

Figure 4A:
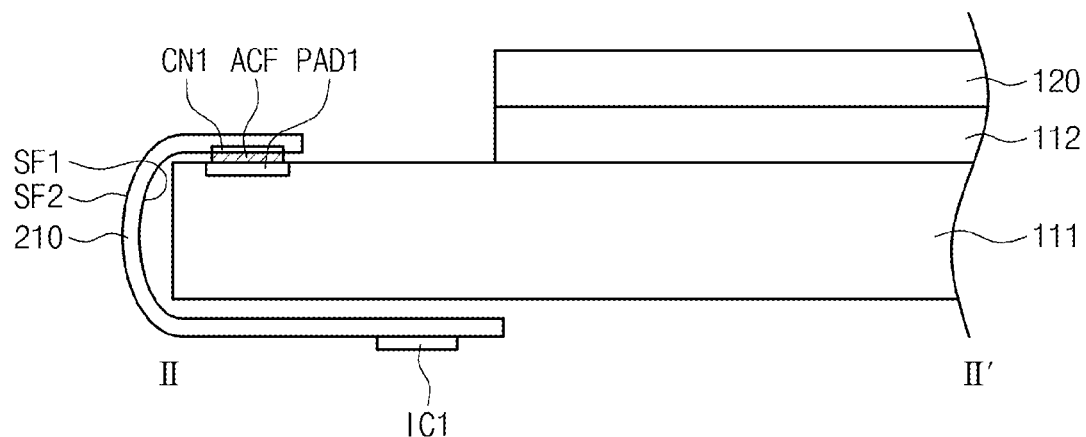
FIG. 4A is a sectional view taken along II-II' of FIG. 1.
Figure 4B:
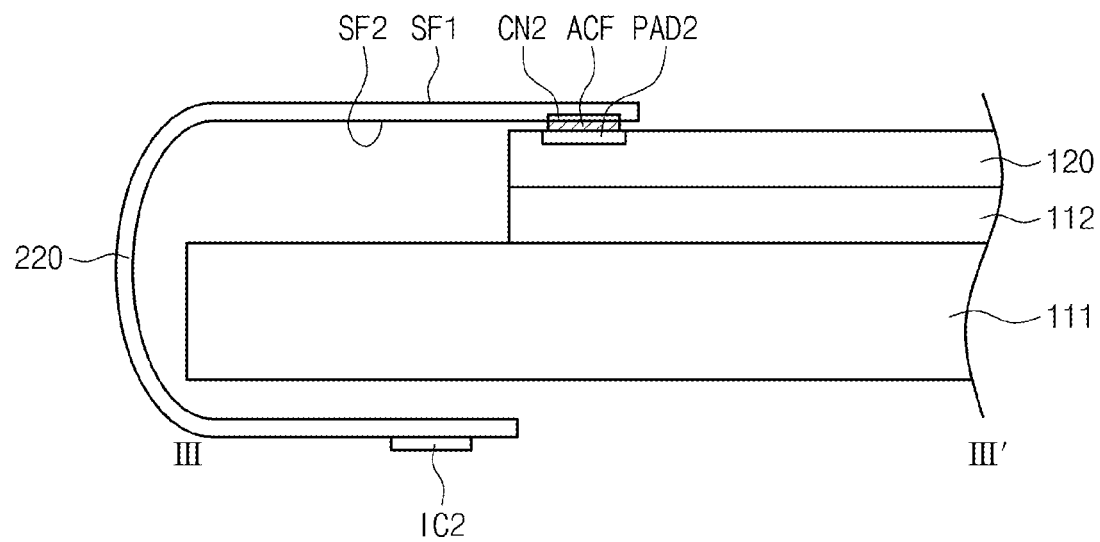
FIG. 4B is a sectional view taken along III-III' of FIG. 1.

FIG. 4A is a sectional view taken along II-II' of FIG. 1, and FIG. 4B is a sectional view taken along III-III' of FIG. 1. In describing the invention in conjunction with FIGS. 4A and 4B, the reference marks for the components indicated by FIGS. 1, 2 and 3 will be included and the same components will not be further detailed.

Referring to FIGS. 4A and 4B, the first circuit portion 210 or second circuit portion 220 of circuit board 200 (FIG. 1) may include a first surface SF1 and a second surface SF2 opposite the first surface SF1.

The display panel 110 may include the first pad portion PAD1 electrically connected to the first circuit portion 210 of FIG. 4A, and the touch panel 120 may include the second pad portion PAD2 electrically connected to the second circuit portion 220 of FIG. 4B.

The first circuit portion 210 may have a first connection CN1 electrically connected to the display panel 110, and the second circuit portion 220 may have a second connection CN2 electrically connected to the touch panel 120. In this embodiment, the first connection CN1 may be disposed in the first surface SF1 while the second connection CN2 may be disposed in the second surface SF2.

The first connection CN1 and the first pad portion PAD1 may be electrically connected to each other through an adhesive conduction film ACF, and the second connection CN1 and the second pad portion PAD2 may be also electrically connected to each other through such an adhesive conduction film ACF. In this embodiment, the adhesive conduction film ACF may be an anisotropic conduction film containing microscopic conduction particles such as nickel, carbon, or plumbum, and an adhesive insulation.

In the circuit board 200 of FIG. 1, a first drive pump ICI of FIG. 4A and a second drive chip IC2 of FIG. 4B may be placed.

The first drive chip IC1 may function to generate drive signals for displaying an image on the display panel 110 and may be disposed on the first circuit portion 210. The second drive chip IC2 may receive an electric signal due to a touch input from the touch panel 120 and determine the touch position, and it may output an independent signal for executing a specific function in accordance with the determined result. The second drive chip IC2 may be disposed on the second circuit portion 220.

In this embodiment, the first drive chip IC1 may be disposed in the second surface SF2 while the second drive chip IC2 may be disposed on the first surface SF1. When the first circuit portion 210 and second circuit portion 220 are each bent toward the backside of the first plate 111, the first and second drive chips IC1 and IC2, respectively, do not directly contact the first plate 111. Therefore, it is possible to prevent the first plate 111 from being pressed down by the first and second drive chips IC1 and IC2, respectively.

Figure 5:
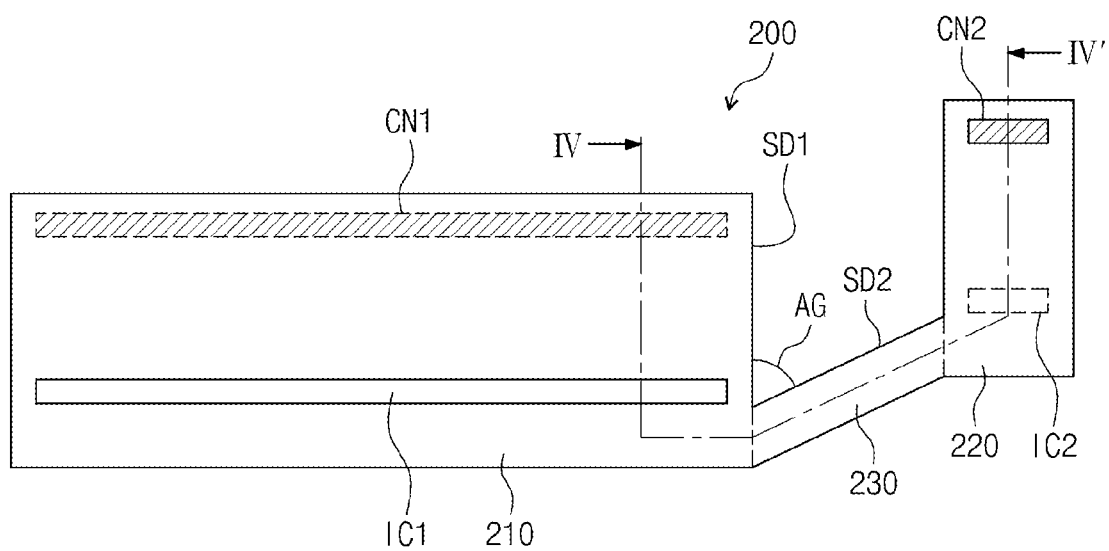
FIG. 5 is a plan view illustrating the circuit board of FIG. 1.

FIG. 5 is a plan view illustrating the circuit board of FIG. 1. In describing the invention in conjunction with FIG. 5, the reference marks for the components indicated by FIGS. 4A and 4B will be accompanied and the same components will not be further detailed.

Referring to FIG. 5 as showing the second surface SF2 of FIG. 4A of the circuit board 200 on a plane, the components disposed in the first surface SF1 of FIG. 4A are indicated by broken lines while the second surface SF2 of FIG. 4A are indicated by solid lines.

The first circuit portion 210 may have a first side SD1 linking up with the bending portion 230. The bending portion 230 may have a second side SD2 linking up with the first side SD1. The first side SD1 may form an acute angle AG with the second side SD2. The acute angle AG may be between 0° and 90° in accordance with a size of the display panel 110 of FIG. 1 and locations of the first and second pad portions PAD1 and PAD2, respectively, of FIG. 1.

The second circuit portion 220 may be more easily aligned in an up/down direction (UD of FIG. 7) if the acute angle AG is smaller than 90°, rather than if the acute angle AG is at 90°. Additionally, the second circuit portion 220 may be more easily aligned in a left/right direction (LR of FIG. 7) if the acute angle AG is larger than 0°, rather than if the acute angle AG is at 0°.

In this embodiment, when adhering the second circuit portion 220 to the touch panel 120 of FIG. 1 after adhering the first circuit portion 210 to the display panel 110 of FIG. 1, it may be easier to align the second circuit portion 220. Accordingly, it is profitable to reduce defects arising from misalignment of the second circuit portion 220. As a result, the display apparatus 100 of FIG. 1 can be improved in ease of fabrication and hence in product yields.

FIG. 6A is a sectional view taken along IV-IV' of FIG. 5. In describing the invention in conjunction with FIG. 6A, the reference marks for the components indicated by FIG. 5 will be accompanied and the same components will not be further detailed.

Referring to FIG. 6A, each of the first and second circuit portions 210 and 220, respectively, includes a first base plate BP1, a first metal line ML1, a second base plate BP2, a second metal line ML2, a first cover film CF1, a second cover film CF2, and a sticky layer SL.

The first metal line ML1 may be placed on the first base plate BP1 while the second metal line ML2 may be placed on the second base plate BP2. Otherwise, in another embodiment, the second metal line ML2 may be opposite the first metal line ML1, interposing the first base plate BP1 between them. In this feature, it is allowable to exclude except the sticky layer SL and the second base plate BP2 from the configuration.

In this embodiment, the sticky layer SL is laid between the first and second base plates BP1 and BP2, respectively, enforcing the first and second base plates BP1 and BP2, respectively, to adhere to each other.

The first cover film CF1 functions to cover the first metal line ML1 while the second cover film CF2 functions to cover the second metal line ML2.

The bending portion 230 may include a third base plate BP3, a third metal line ML3 placed on the third base plate BP3, and a protection layer CI covering the third metal line ML3.

In this embodiment, the third base plate BP3 may be integrated with the first base plate BP1 and the third metal line ML3 may be disposed on the same level with the first metal line ML1. The third metal line ML3 is electrically connected to the first metal line ML1. The second metal line ML2 not disposed on the same level with the third metal line ML3 may be electrically connected to the third metal line ML3 by way of a via hole (H0 of FIG. 6C).

In the circuit board 200, the first and second cover films CF1 and CF2, respectively, may be removed from a position corresponding to the bending portion 230. Therefore, the protection layer CI may be placed on the exposed third metal line ML3, protecting the third metal line ML3 from external gases and moisture.

The protection layer CI may include a photocurable resin. For example, the protection layer CI may include one of ultraviolet ray curing ink (UV ink) and infrared ray curing ink (IR ink). The protection layer CI may be thinner than each of the first and second cover films CF1 and CF2, respectively. For example, the protection layer CI may be formed with enough thickness to protect the third metal line ML3 from external gases and moisture. The third metal line ML3 is therefore covered by the protection later CI instead of the first and second cover films CF1 and CF2, respectively, helping the bending portion 230 to more easily curve than the first and second circuit portions 210 and 220, respectively. While this embodiment is shown with the first and second cover films CF1 and CF2, respectively, of the bending portion 230 entirely removed, it may also be permissible, in another embodiment, to remove parts of the first and second cover films CF1 and CF2, respectively, only in correspondence with a region where the bending portion 230 substantially curves.

Now, an altitudinal thickness of the first circuit portion 210 will be referred to as a first thickness T1, an altitudinal thickness of the second circuit portion 220 will be referred to as a second thickness T2, and an altitudinal thickness of the bending portion 230 will be referred to as a third thickness T3.

In this embodiment, the bending portion 230 is featured to exclude the first and second cover films CF1 and CF2, respectively, but including single layer circuit architecture. Thus, the third thickness T3 may be smaller than the first and second thicknesses T1 and T2, respectively. Since the third thickness T3 is relatively smaller than the first and second thicknesses T1 and T2, respectively, the bending portion 230 may be more flexible than the first and second circuit portions 210 and 220, respectively. Therefore, the bending portion 230 can be conditioned to easily curve toward the first circuit portion 210.

In the first cover film CF1 corresponding to a position of the first connection CN1 of the first circuit portion 210, first opening OP1 may be defined, and in the second cover film CF2 corresponding to a position of the second connection CN2 of the second circuit portion 220, a second opening OP2 may be defined.

The first pad portion PAD1 of FIG. 1 may be electrically connected to the first connection CN1 of the first circuit portion 210 by way of the first opening OP1, and the second pad portion PAD2 of FIG. 1 may be electrically connected to the second connection CN2 of the second circuit portion 220 by way of the second opening OP2.

This embodiment is shown wherein as each of the first and second circuit portions 210 and 220, respectively, includes double layer circuit architecture while the bending portion 230 includes single layer circuit architecture. Another embodiment, not restricted hereto, may be featured as each of the first and second circuit portions 210 and 220 and the bending portion 230 includes two or multiple layer circuit architecture. Additionally, still another embodiment may be configured as each of the first and second circuit portions 210 and 220, respectively, and the bending portion 230 includes single-layer circuit architecture.

Figure 6B:
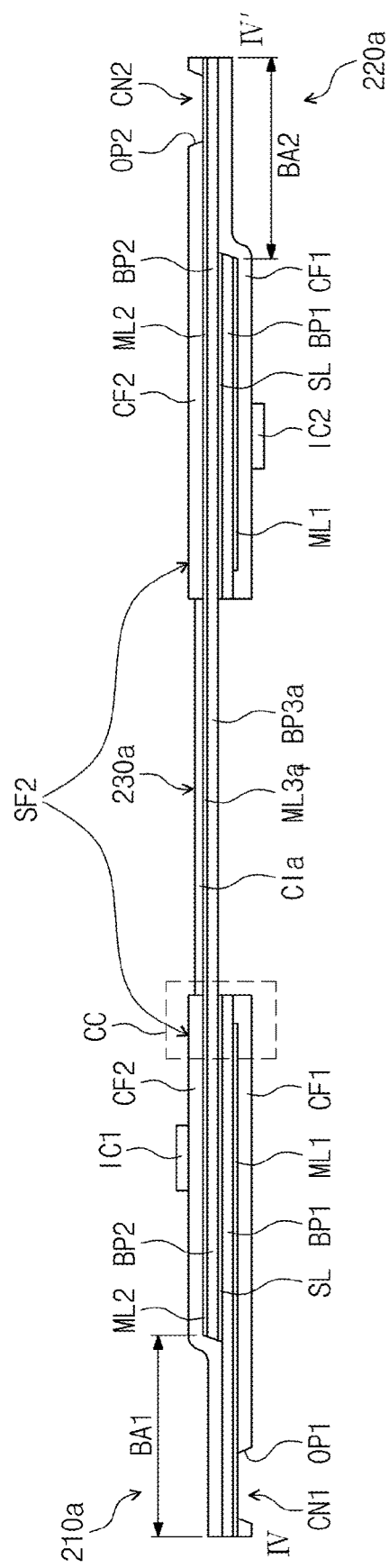
FIG. 6B is a plan view according to another embodiment of the present invention, taken along IV-IV' of FIG. 5.
Figure 6C:
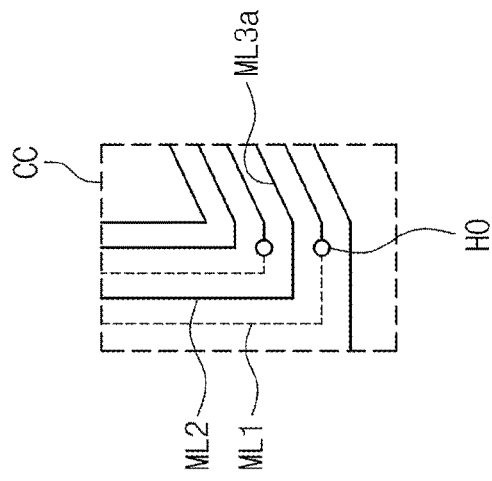
FIG. 6C is a schematic plan view enlarging a part of the display apparatus shown in FIG. 6B.

FIG. 6B is a plan view, according to another embodiment of the present invention, taken along IV-IV' of FIG. 5, and FIG. 6C is a schematic plan view enlarging a part of the display apparatus shown in FIG. 6B. In describing the invention in conjunction with FIG. 6B and FIG. 6C, the reference marks for the components indicated by FIG. 6A will be included and the same components will not be further detailed.

Referring to FIG. 6B and FIG. 6C, a bending portion 230a may include a third base plate BP3a, a third metal line ML3a placed on the third base plate BP3a, a protection layer CIa covering the third metal line ML3a.

In this embodiment, the third base plate BP3a may be link with the second base plate BP2 in a body and the third metal line ML3a may be disposed on the same level as the second metal line ML2. The third metal line ML3a may be electrically connected to the second metal line ML2. The second metal line ML2 not disposed on the same level as the third metal line ML3a may be electrically connected to the third metal line ML3a through the via hole H0.

For the sake of descriptive convenience, explosively shown is a region CC where a first circuit portion 210a is connected to the bending portion 230a. The via hole H0 is referred to as a hole penetrating layers between the first and second metal lines ML1 and ML2, respectively. Thereby, the second metal line ML2 can be electrically connected to the third metal line ML3a, which is laid on the same level as the first metal line ML1, by way of the via hole H0.

In this embodiment, the single layer circuit architecture may be included individually in a first area BA1 corresponding to a position of the first connection CN1 of the first circuit portion 210a, and in a second area BA2 corresponding to a position of the second connection CN2 of the second circuit portion 220a.

Figure 7:
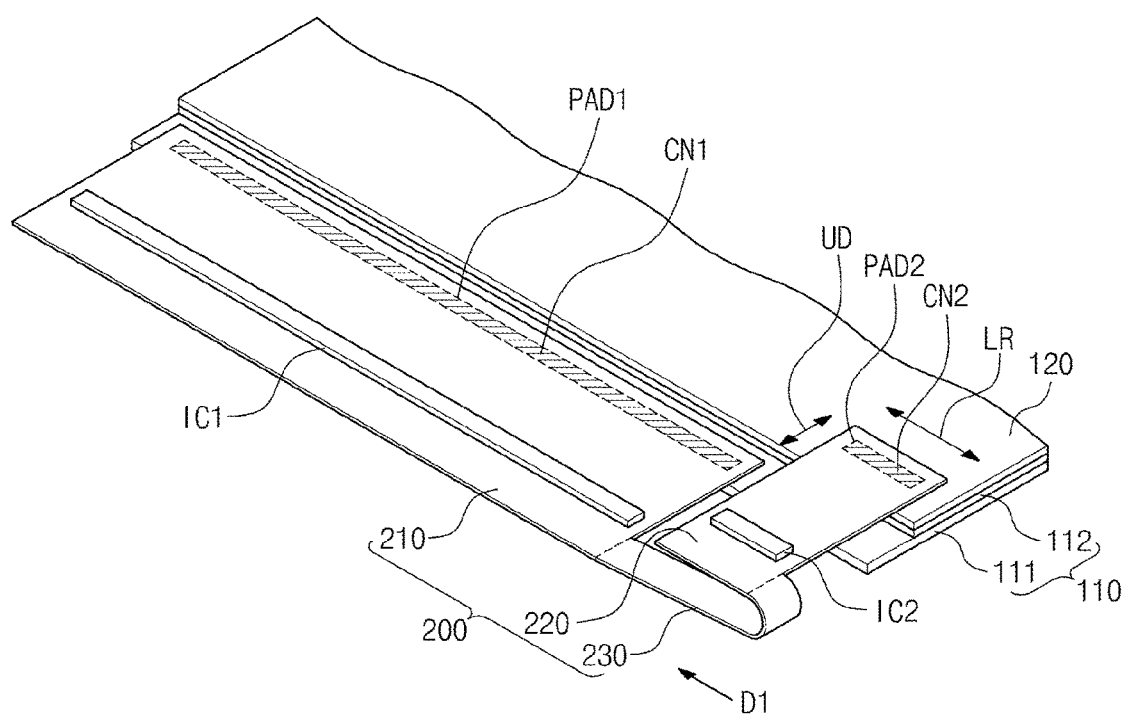
FIG. 7 is a perspective view enlarging a part of the display apparatus shown in FIG. 1.

FIG. 7 is a perspective view enlarging a part of the display apparatus shown in FIG. 1.

Referring to FIG. 7, the bending portion 230 may curve in a direction D1 toward the first circuit portion 210. As the circuit board 200 has the bending portion 230, many advantages can be brought about, as follows, while bonding the circuit board 200 to the display panel 110 and the touch panel 120, respectively.

After aligning the first pad portion PAD1 of the first plate 111 with the first connection CN1 of the first circuit portion 210, the first pad portion PAD1 and the first connection CN1 are adhered to each other by means of compression. Then the bending portion 230 curves to align the second connection CN2 of the second circuit portion 220 therewith. As the bending portion 230 moves to a curve, it becomes easier to align the second circuit portion 220 in the left/right direction LR.

Unless, different from embodiments of the present invention, the connection linking the first circuit portion 210 with the second circuit portion 220 is unable to curve, the first and second circuit portions 210 and 220, respectively, may be disposed horizontally. Under this horizontal disposition, the connection will be folded and eventually broken off while shifting the second circuit portion 220 in the left/right and up/down directions LR and UD, respectively, for its alignment. Furthermore, due to the alignment of the second circuit portion 220, the circuit board 200 can be folded and, what is worse, even with irregular folding positions. Such a folding of the circuit board 200 may cause defects by cutoff of the connection lines. However, according to this embodiment, since the bending portion 230 corresponds to the connections curves and moves in position even while the second circuit portion 220 is shifting in the left/right and up/down directions LR and UD, respectively, it is possible to minimize the probability of cutting the lines off in the circuit board 200 even though the bending portion 230 is folded. This feature facilitates to a greater extent alignment of the second circuit portion 220 which is to be adhered to the touch panel 120.

Figure 8:
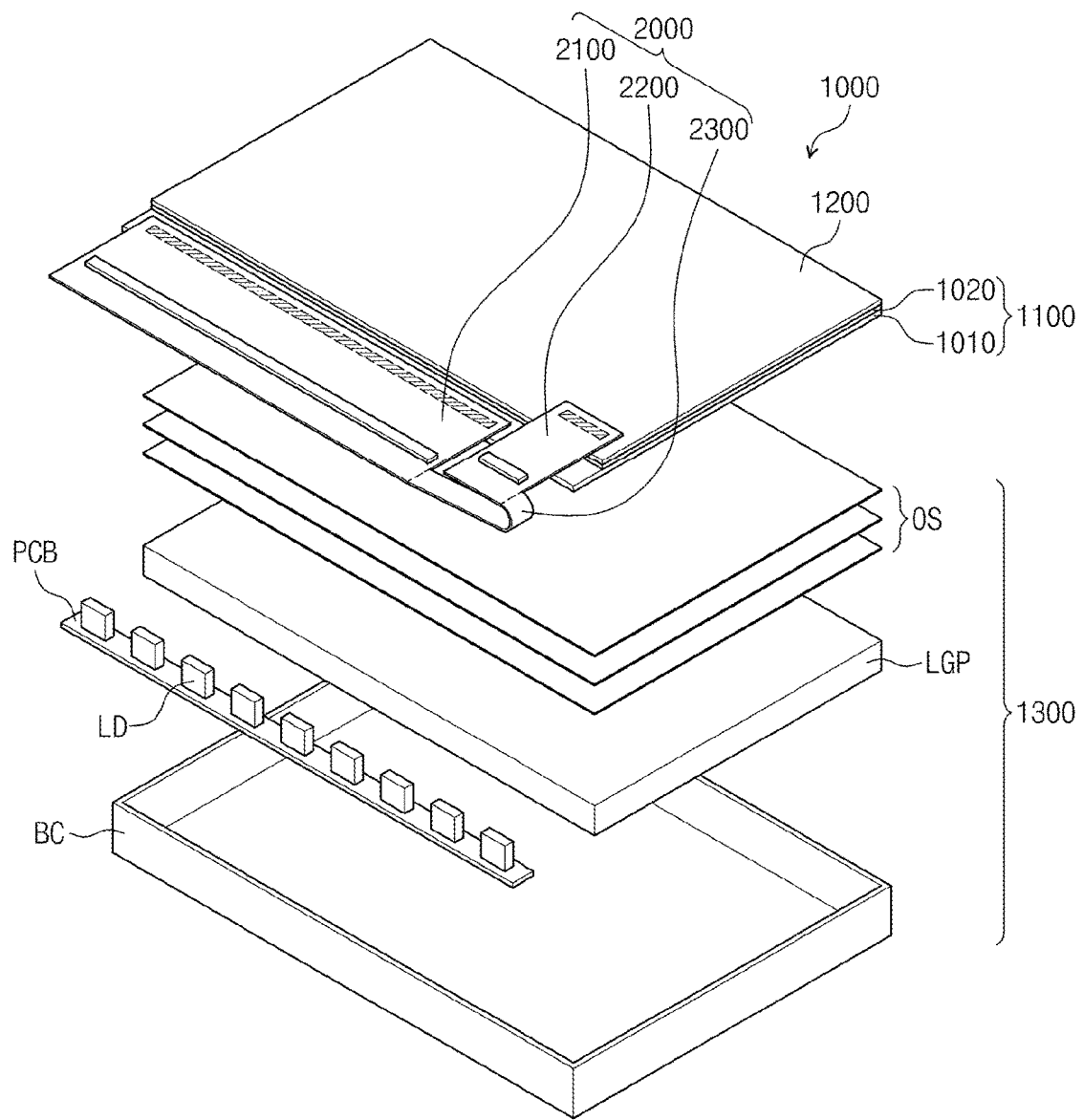
FIG. 8 is an explosively perspective view illustrating a display apparatus in accordance with another embodiment of the present invention.

FIG. 8 is an explosively perspective view illustrating a display apparatus in accordance with another embodiment of the present invention.

Referring to FIG. 8, the display apparatus 1000 includes a display panel 1100, a touch panel 1200, a circuit board 2000, and a backlight unit 1300.

The display panel 1100 includes a display plate 1010, a facing plate 1020 opposite the display plate 1010, and a liquid crystal layer (not shown) interposed between the display plate 1010 and the facing plate 1020. In a planar view, the display panel 1100 may have a display area wherein an image is displayed, and a non-display area, being encompassed by the display area, wherein any image is not displayed.

The touch panel 1200 is disposed on the display panel 1100, which may operate in a mode of capacitance, resistive films, infrared rays, and supersonic waves.

The circuit board 2000 may include a first circuit portion 2100 connected to the display panel 1100, a second circuit portion 2200 connected to the touch panel 1200, and a bending portion 2300.

The bending portion 2300 links the first circuit portion 2100 with the second circuit portion 2200. The first and second circuit portions 2100 and 2200, respectively, and the bending portion 2300 may be link up with each other in one body. This embodiment makes it allowable to link the first circuit portion 2100 with the second circuit portion 2200 without an additional connector or member, so that it is possible to reduce product costs for such connectors.

The bending portion 2300 is able to curve in the direction D1 of FIG. 7 toward the first circuit portion 2100. The bending portion 2300 may be more flexible than the first and second circuit portions 2100 and 2200, respectively. Therefore, it is possible to make an alignment of the second circuit portion 2200 easier when adhering the second circuit portion 2200 to the touch panel 1200 after adhering the first circuit portion 2100 to the display panel 1100.

The backlight unit 1300 may include optical sheets OS, a light guiding plate LGP, light sources LD, a printed circuit board PCB on which the light sources LD are mounted, and a bottom chassis BC.

The bottom chassis BC may accommodate the light sources LD, the light guiding plate LGP, and the optical sheets OS. The light sources LD may supply light to at least one side of the light guiding plate LGP. The light guiding plate LGP may accept light from the light sources LD and guide the light toward the display panel 1100. The optical sheets OS may be disposed between the light guiding plate LGP and the display panel 1100. The optical sheets OS may function to control optical paths of the light lead by the light guiding plate LGP.

As described above, a display apparatus according to the embodiments of the present invention includes a first circuit portion electrically connected to a display panel, a second circuit portion electrically connected to a touch panel, and a bending portion electrically connected to the first and second circuit portions, the structure of which may allow the display apparatus to be formed without an additional component or member, such as a connector, for electrically connecting the first circuit portion to the second circuit portion.

Additionally, in fabricating such a display apparatus with the disclosed structure, a bending portion more flexible than the first and second circuit portions contributes to preventing a circuit broad from folding, even though the second circuit portion is floating for alignment between the first and second circuit portions, while bonding the second circuit portion to the touch panel after bonding the first circuit portion to the display panel. Accordingly, it is possible to prevent disconnection of metal lines arranged on the circuit board. In other words, a marginal space allowing the circuit board to move during the bonding process extends to facilitate the bonding process.

While the present invention has been described with reference to exemplary embodiments, it will be apparent to those skilled in the art that various changes and modifications may be made without departing from the spirit and scope of the present invention. Therefore, it should be understood that the above embodiments are not limiting, but illustrative.

What is claimed is:

1. A display apparatus, comprising:
   a display panel that displays an image;
   a touch panel disposed on the display panel; and
   a circuit board electrically connected to each of the display panel and the touch panel, and including a first surface and a second surface opposite the first surface;
   wherein the circuit board comprises:
   a first circuit portion including a first connection disposed in the first surface and electrically connected to the display panel, the first circuit portion having a first side surface perpendicular to the first surface;
   a second circuit portion including a second connection disposed in the second surface and electrically connected to the touch panel; and
   a bending portion for linking the first circuit portion to the second circuit portion, and curving in a direction toward the first circuit portion, the bending portion having a second side surface perpendicular to the first surface, one end of the second side surface contacting the first circuit portion, another end of the second side surface contacting the second circuit portion, the second side surface formed at an acute angle with the first side surface.

2. The display apparatus according to claim 1, wherein each of the first and second circuit portions comprises:
   a first base plate;
   a first metal line disposed on the first base plate; and
   a first cover film covering the first metal line.

3. The display apparatus according to claim 2, wherein each of the first and second circuit portions comprises:
   a second metal line opposite the first metal line, and interposing the first base plate; and
   a second cover film covering the second metal line.

4. The display apparatus according to claim 3, wherein each of the first and second circuit portions further comprises:
- a second base plate disposed between the first base plate and the second metal line; and
- a sticky layer disposed between the first base plate and the second base plate, and adhering the first base plate to the second base plate.

5. The display apparatus according to claim 4, wherein the bending portion comprises:
- a third base plate;
- a third metal line disposed on the third base plate; and
- a protection layer covering the third metal line.

6. The display apparatus according to claim 5, wherein the bending portion is smaller in thickness than each of the first and second circuit portions.

7. The display apparatus according to claim 5, wherein the bending portion is more flexible than each of the first and second circuit portions.

8. The display apparatus according to claim 5, wherein the third base plate is integrated with the first base plate in one body.

9. The display apparatus according to claim 5, wherein the third base plate is integrated with the second base plate in one body.

10. The display apparatus according to claim 5, wherein the protection layer comprises a photocurable resin.

11. The display apparatus according to claim 4, wherein the display panel comprises a first pad portion electrically connected to the first connection;
- wherein a first opening is defined in the first cover film corresponding to the first connection;
- wherein the first connection is electrically connected to the first pad portion through the first opening;
- wherein the touch panel comprises a second pad portion electrically connected to the second connection;
- wherein a second opening is defined in the second cover film corresponding to the second connection; and
- wherein the second connection is electrically connected to the second pad portion through the second opening.

12. The display apparatus according to claim 11, further comprising:
- a first drive chip disposed in the second surface; and
- a second drive chip disposed in the first surface;
- wherein the first drive chip is disposed on the first circuit portion and the second drive chip is disposed on the second circuit portion.

13. The display apparatus according to claim 1, wherein the display panel is an organic light emitting display panel.

14. The display apparatus according to claim 1, further comprising a backlight unit configured to supply light to the display panel and disposed under the display panel;
- wherein the display panel comprises a display plate, a facing plate, and a liquid crystal layer interposed between the display plate and the facing plate.

* * * * *